United States Patent [19]

Harper et al.

[11] Patent Number: 4,843,895

[45] Date of Patent: Jul. 4, 1989

[54] TEST STAND FOR R/C VEHICLES

[76] Inventors: Andrew K. Harper; Kenneth B. Harper, both of 235 W. Park, Winter Park, Fla. 32789

[21] Appl. No.: 173,093

[22] Filed: Mar. 24, 1988

[51] Int. Cl.⁴ .............................................. G01M 17/00
[52] U.S. Cl. .................................... 73/865.9; 73/117
[58] Field of Search ............................... 73/117, 865.9

[56] References Cited

FOREIGN PATENT DOCUMENTS

| 195361 | 8/1986 | Japan | 73/865.9 |
|---|---|---|---|
| 1006958 | 3/1983 | U.S.S.R. | 73/117 |
| 1032344 | 7/1983 | U.S.S.R. | 73/117 |

Primary Examiner—Tom Noland
Attorney, Agent, or Firm—Warren L. Franz

[57] ABSTRACT

A portable test stand and track simulator for radio-controlled model racers has a cylindrical drum journalled for free rotation between arms extending from a vertical post pivotally mounted within aligned openings of a bracket attached to the upright slanted handle portion of a wheelable support frame. The drum is larger than the racer and has a circumferential surface that is covered with a polyethylene pile or other terrain simulating material. An open box-like basket fixed to the frame handle serves to hold the front or back wheels of the vehicle with the aid of pins passing through basket perforations, while the other wheels are positioned on the drum surface. A generator or cyclocomputer is arranged to determine the speed at which the drum surface is driven by the restrained car. Markers on a drum support wheel provide stroboscopic calibration. A crank handle balanced by an oppositely positioned counterweight serves to rotate the drum manually. A stop pin passing horizontally through the vertical pivot post extends through a slot in the bracket to limit lateral drum articulation, and a latch rotatably attached to the bracket selectively captures the pin to wholly prevent the articulation when desired.

20 Claims, 3 Drawing Sheets

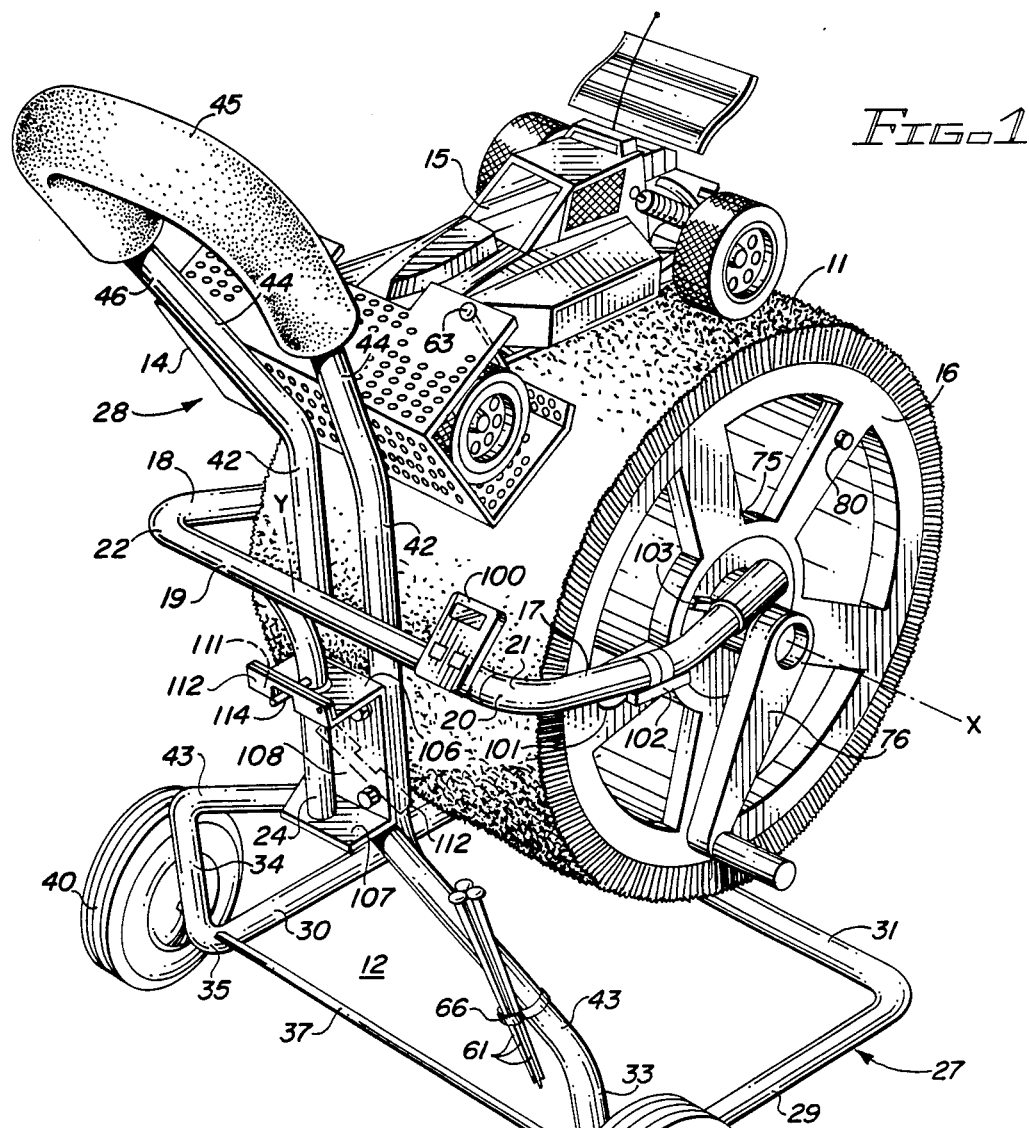
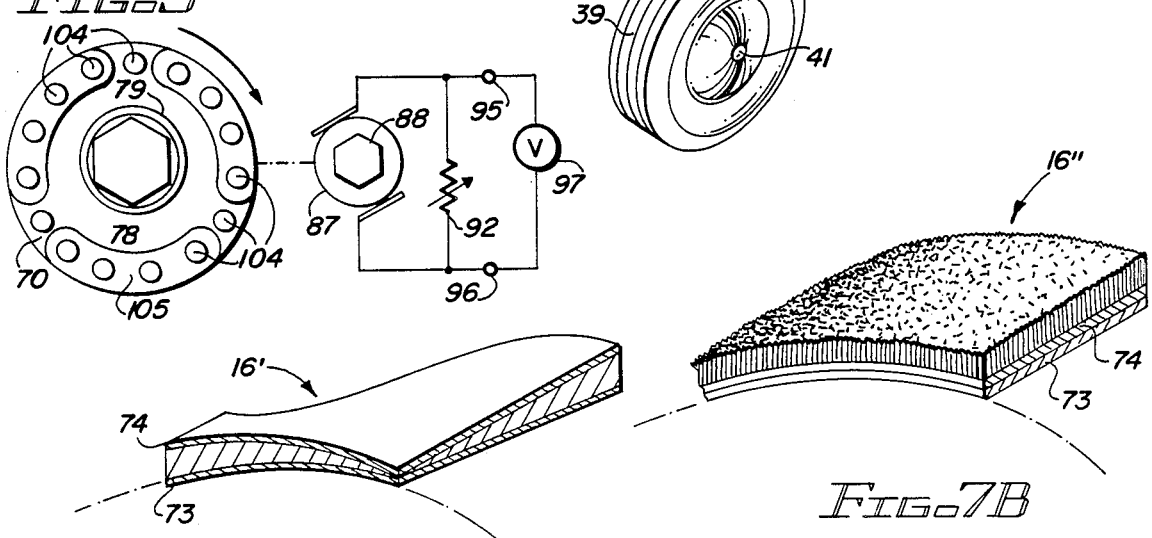

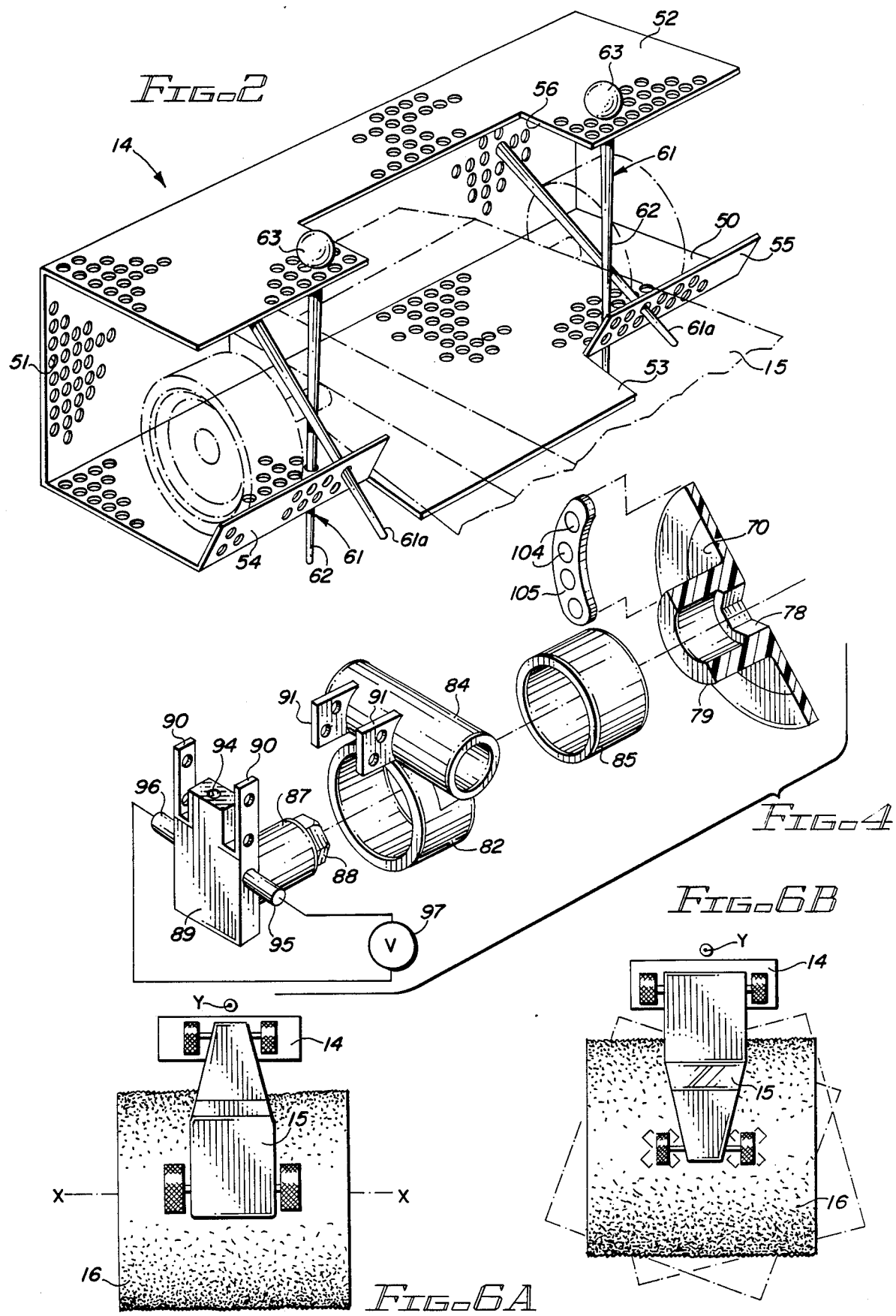

TEST STAND FOR R/C VEHICLES

This invention relates to a test stand and track simulator for radio controlled (R/C) model racers and similar vehicles.

BACKGROUND OF THE INVENTION

There is increasing interest as a hobby and recreation sport in the building and racing of radio controlled vehicles such as R/C electric auto racers. Competitive events sponsored by organizations such as the ROAR (Radio Operated Auto Racing) organization are gaining widespread appeal. The ROAR, for example, serves as a national governing body for R/C car racing, setting rules by which cars are built and raced and acting as a sanctioning body for races around the country. Races may, for example, be held on off-road dirt tracks or on other rough terrain, or on indoor oval tracks with surfaces such as on-road carpet.

Popular cars come in two-wheel or four-wheel drive versions, having on-board servo throttle, brake, and directional controls responsive to signals received from handheld radio signal transmitters. A typical such vehicle to which the present invention has application is the R/C 10 (Radio Control - 1/10th Scale) Off Road Buggy two-wheel drive open class racer.

As with full-size auto racers, competitive edge is sought with the scaled-down R/C models by hyping them up to improve handling response and maximize performance. Handling and performance are dictated by many factors including wheel size (diameter and thickness), tread characteristics, motor gear ratios, suspension, motor windings, total battery energy, and so forth. In making adjustments and improvements, it is difficult to evaluate what parameter selection is optimum.

It is an object of the present invention to provide a test stand and track simulator for R/C racers and similar vehicles that enables performance to be checked and vehicle tracking to be verified.

SUMMARY OF THE INVENTION

The invention provides a portable test stand and track simulator for checking the performance and tracking of radio-controlled model racers and similar vehicles. The stand is provided with a movable endless terrain simulating surface and means for holding a vehicle stationary relative to the stand, with its front or back wheels in frictional engagement with the surface, so that the wheels drive the surface. Means provided for determining the tangential velocity of the driven surface adjacent the wheels serves to give an indication of the speed the vehicle would attain unrestrained on an actual track having the simulated terrain.

In one aspect of the invention, a drum covered with a terrain simulating surface is mounted for rotation on a wheelable test stand having an upwardly extending slanted handle. A cage or basket located on the slant handle forward of the drum serves to restrain the car with its front or back wheels elevated and the other wheels on the drum surface. A mechanism, such as a generator whose output is connected to a voltage meter, cooperates with the drum to give a measure of the speed of drum rotation caused by running the restrained car, thereby giving an indication of car speed.

To evaluate car tracking and suspension, the drum is provided with a crank for manual rotation, and is mounted for lateral articulation about the handle, so that the drift of the drum surface due to movement of the wheels may be observed as an indication of vehicle tracking on an actual track. In a preferred embodiment of the invention, described in greater detail below, the drum is configured so that the moment of inertia of the driven drum equates to the mass of the vehicle that would react against the actual track.

In one form of the invention, several interchangeable drums are provided, each having a different terrain simulating surface.

BRIEF DESCRIPTION OF THE DRAWINGS

Embodiments of the invention have been chosen for purposes of illustration and description and are shown in the accompanying drawings, wherein:

FIG. 1 is a perspective view of a test stand and track simulator in accordance with the present invention;

FIG. 2 is an enlarged perspective representation of the basket of FIG. 1;

FIG. 4 is an exploded view of the components of the generator side drum mounting;

FIG. 5 is a schematic view of the generator circuitry of FIG. 4;

FIGS. 6A–6B are schematic views showing the operation of the invention; and

FIGS. 7A–7B depict different terrain simulating surfaces.

Throughout the drawings, like elements are referred to by like numerals.

DESCRIPTION OF THE PREFERRED EMBODIMENT

Figure 3:
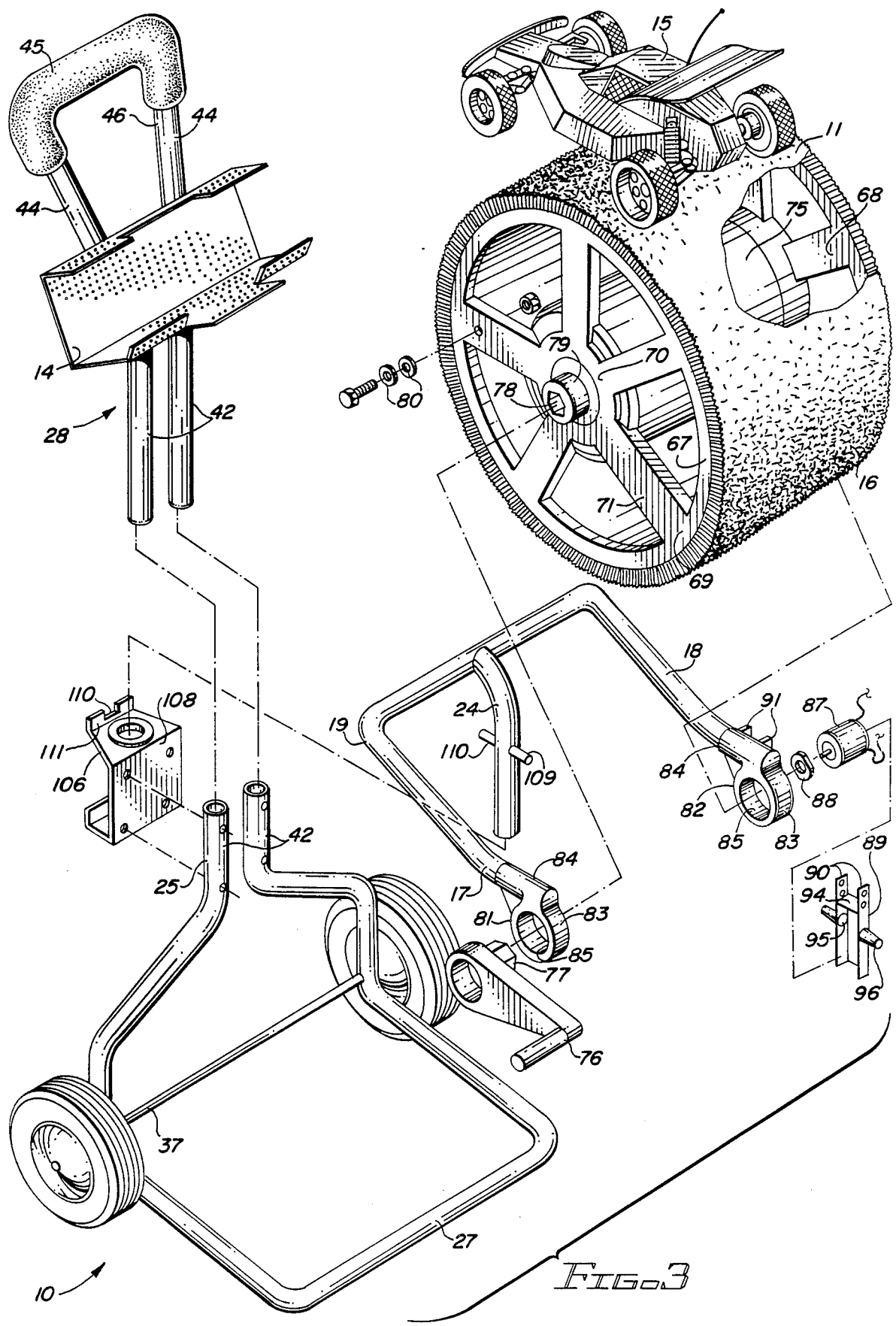
FIG. 3 is an exploded view (with cutaway) of the test stand of FIG. 1.

FIG. 1 shows an implementation 10 of a test stand and track simulator for radio-controlled model racers and similar vehicles which comprises a terrain simulating surface 11 in the form of an endless loop movably supported on a frame 12. A vehicle restraining member in the form of a basket or cage 14 mounted on the frame 12 serves to restrain a vehicle 15 to be evaluated.

As shown in a preferred embodiment 10 (FIG. 1), the terrain simulating surface 11 takes the form of the outer cylindrical surface of a drum 16 mounted for free rotation relative to the frame 12 about a horizontal central axis X. The drum 16 is journaled between a pair of rearwardly extending ends of arms 17, 18 of a drum support tubing assembly 19. A horizontally extending backrail 20 of the assembly 19 runs laterally spaced from the surface 11 across the width of the drum 16 extending laterally for a short distance beyond the sides of the drum to shoulders 21, 22 before turning rearwardly into the arms 17, 18. The backrail 20 is carried at its center by a vertical post 24 mounted for pivotal movement about a vertical axis Y on a drum carrier bracket 25 which is secured to the frame assembly 12.

The frame 12 takes the form of a portable, wheelable stand having a stabilizing base assembly 27 and an upright handle portion 28. The base comprises two oppositely disposed forwardly extending tubular sides 29, 30 between whose back ends extends a ground rail 31. The components 29, 30, 31 of the base assembly 27 outline three sides of a rectangular configuration providing stability for the stand 12. The fronts of the sides 2,, 30 are joined by upwardly extending legs 33, 34 which have aligned holes 35 through which opposite ends of a laterally extending axle shaft 37 extends for mounting wheels 39, 40 externally of the legs 33, 34. The wheel 39, 40 are secured to the shaft 37 by means of push nuts 41 with washers (not shown) received between the inner hub of the wheel and the legs.

The upright portion 28 of frame 12 has two extending vertically upward side-by-side from the top ends of diagonal members 43 which extend inwardly and upwardly from the tops of the legs 33, 34. The tops of the posts 42 culminate in forwardly and outwardly extending diverging elements 44 that terminate in an intermediate horizontal grip element 45 to make up a handle 46 which is forwardly and upwardly slanted at an angle of about 30 degrees. In the embodiment illustrated in FIG. 1, the drum carrier bracket 25 is fixedly mounted by suitable fastening means to the uprights 42, and the basket 14 is likewise fixedly mounted to the diverging elements 44 of the handle 46. The base assembly 27 and handle portion 28 cooperate so that tilting the handle 46 forward will raise the ground rail 31 off the ground to permit the test stand 10 to be transported by rolling on wheels 39, 40. Releasing the handle 46 will bring the ground rail back into contact with the ground for holding the stand 10 stationary.

A detail of the basket 14 is illustrated in FIG. 2, which shows an open-ended box-like structure with its rear side open and having a floor 50, a wall 51 and a top 52. The back of the floor 50 extends into a downwardly angled lip 53 which is bounded on either side by upwardly extending escape ramps 54, 55. The top 52 is characterized by a cutout portion 56 centrally positioned to the open side thereof. The basket dimensions, and especially the relative dimensions of elements 53, 54, 55 and 56, are chosen to accommodate various sizes of vehicle 15 (dashed lines) that will be restrained therein. The basket 14 is preferably formed by bending a sheet of perforated metal, so that all of the elements 53, 54, 55 and 56 include perforations.

A plurality of pins 61 having shanks 62 and heads 63 are provided to serve as retaining members for securing the vehicle 15 within the confines of the basket 14 during operation of the test stand 10, as described more fully below. The shanks 62 are narrower and the heads 63 are wider than the perforations (whose size is shown exaggerated in FIG. 2 for purposes of presentation.) The pins 61 can be extended as desired through the perforations of the basket 14, with the length of the shank 62 being longer than the separation of the elements 53, 54, 55 and 56 from each other, so that the pins 61 may be inserted from a perforation on one element to a corresponding substantially aligned perforation on an opposite element and secured by means of the head 63 from further movement through the perforations. FIG. 2 shows pins 61 extending from the top 52 to the floor 50 to keep the vehicle 15 within the basket 14, and pins 61a extending from the front wall 51 to the ramps 54, 55 to raise the captured wheels off the floor, as necessary, such as during speed performance testing of four wheel drive vehicles.

A quill or quiver 66 mounted at a convenient location (such as on one of the diagonals 43) of the frame 12 serves as a holder of a plurality of pins 61 until usage thereof. The drum 16 comprises oppositely disposed support wheels 67, 68 (see FIG. 3), each comprising an outer ring 69 carried in annular position from a hub 70 by means of radially outward extending spokes or ribs 71. The surface 11 extends circumferentially between the outer perimeters of the respective rings 69 of the support wheels 67, 68 and takes the form of an underlayment 73 (FIGS. 7A–7B) on top of which is fixed a track simulating material 74, described further below.

The track drum 16 is mounted for rotation on the arms 17, 18 by means of journal assemblies 81, 82 comprising journal rings 83 from the top of which tangentially project tubular portions 84 which slide over the rearwardly projecting ends of arms 17, 18 (FIG. 3) and are secured thereto by conventional means. Bearing inserts in the form of copper babbit or brass bushings 85 (FIG. 4) located within the journals 83 serve to receive boss ends 79 coaxially located on the hubs 70 for free-running rotation therein. It is intended that the drum 16 will run on bushings 85 without lubrication or with only light lubrication providing consistent frictional torque over an extended period.

The drum 11 structure may have a central cylinder 75 (FIG. 3) connecting the support wheels 67, 68 and holding the hub 70 and bearing bosses 79 in spaced relationship.

As shown in FIG. 3, a crank handle 76 having a hexagonal drive hub 77 is removably inserted within a hexagonal recess 78 on one boss 79 to present a means for manually rotating the drum 11. The handle of the crank 76 is positioned opposite a counterweight, which may take the form of washers 80 held by a bolt on the spoke 71 opposite the crank handle, as shown in FIG. 3.

In a primary mode of operation of the test stand 10, a vehicle 15 having a wheelbase including front and rear sets of wheels will be positioned with one set of wheels elevated and restrained within the confines of the basket 14 and the other set of wheels resting for track-like engagement with the drum surface 11. As shown, the surface 11 is larger than the wheelbase of the vehicle 15. When the vehicle 15 is powered up to rotate the wheels on the surface 11, the drum 16 will be driven in free rotation within the bushings 85. Determination of the tangential velocity of the surface 11 will thus correlate to a determination of the speed at which the vehicle 15 will travel on the actual track simulated by the surface 11.

Two embodiments of means for determining the tangential velocity of the surface 11 are illustrated. FIGS. 3–5 show a generator scheme in which a generator 87, such as a low wattage DC motor used as a microdynamo, is outfitted to be driven by a hexagonal drive nut 88 which mates with a corresponding hexagonal recess 78 concentrically located on the rotational axis X (FIG. 1) of the drum boss 79 on the non-crank handle 76 side. The generator 87 is housed in a generator housing 89 suitably fastened, such as by means of bars 90 that are secured to lugs 91 extending laterally from the tubular portion 84 of the assembly 82. A variable resistor 92 (FIG. 5) placed in parallel electrical connection to the output terminals of the generator takes the form of a potentiometer located within the chassis 89 that can be adjusted by turning a screwhead exposed to operator manipulation through a porthole 94 in the housing 89. The junctions between the variable resistor and the generator terminals are electrically connected for meter pick-off to test pin connections 95, 96 on opposite sides of the housing 89. A voltmeter 97 (FIGS. 4 and 5), such as a Micronta "Auto-Range" or similar digital multimeter, can be connected across the pins 95, 96 to provide an indication of true speed at the track surface 11 using, for example, the millivolt scale in which ten mV corresponds to a reading of ten mph.

An on-board alternative or supplementary speed indication system is shown in FIG. 1, wherein an electronic speed indicator 100 having microprocessor circuitry is fastened to the frame 12 and electrically connected by means of a wire lead 101 to a magnetic relay or pick-up 102 fastened on the arm 17. A magnet 103 is mounted on an adjacent portion of the drum 16 and is detected as it passes the sensor 103 in accordance with well-known principles. A suitable mechanism for use in this manner is a commercially available cyclocomputer, or similar device, used for speed and other parameter determination in cycling. An advantage of the cyclocomputer over the simple voltmeter arrangement is that it not only selects the display of speed but also measures, stores in memory, and displays maximum speed, total distance, trip distance, average speed and elapsed time.

To achieve calibration of he voltmeter 97, the hub 70 of the support wheel 68 is provided with a plurality of calibration dots 104, conveniently mounted on basel cards 105 (see FIGS. 4 and 5), which comprise black or silver colored markers equidistantly spaced circumferentially about the hub 70. At given rotational speeds of the drum, the dots 104 will appear stationary under illumination of a known stroboscopic light source. For calibration purposes, the stroboscopic effect of a fluorescent light (120 flickers per second) or a blank television picture (60 flickers per second) may be utilized to view the dots 104. For the arrangement shown, three cards 105 having four dark circles each were coordinated with three 120-degree spaced bores already present on the hub 70 (see FIG. 5) to provide a total of 15 circumferentially placed markers 104.

Consider, for example, an endless terrain simulating surface 11 having a circumference of 59 inches, or 4.92 feet. Using a household fluorescent lamp as a stroboscopic source of 120 illuminations per second, and with 15 dots 104 equidistantly spaced about the hub 70 of support wheel 68 (see FIGS. 4 and 5), a stationary dot pattern of 60 dot placements will occur when a vehicle 15 drives the drum to rotate at 240 rpm correlating to a tangential velocity at surface 11 of 19.7 feet per second, or 13.41 mph. With the drum thus driven and the speed being tracked in millivolts (1 millivolt 1 mph) using a voltmeter 97, as with the arrangement shown in FIGS. 3-5, calibration is effected by turning the adjustment screw of the potentiometer 92 (FIG. 5) accessible through the porthole 94 (FIGS. 3 and 4), until the voltmeter reads 13.41 millivolts. When speed is tracked by an electronic indicator 100 (see FIG. 1), calibration to the known speed of 13.41 mph is performed according to the method prescribed by the manufacturer for calibrating the particular device.

As already mentioned, the drum 16 is journalled in a manner to require little or no lubrication. For smooth operation, the drum is balanced by itself before attachment of the crank 76, and then again with the crank and counterweight 80 attached.

As shown in FIGS. 1 and 3, the drum carrier bracket 25 comprises two spaced horizontal plate portions 106, 107 projecting forwardly from the ends of an intermediate vertical plate portion 108 which is secured to the posts 42. The post 24 of the drum support assembly 19 is received down through aligned openings in the plate portions 106, 107 to a point of contact with a stop pin 109 (see FIG. 3) which extends horizontally through the post 24 for a distance greater than the diameter of the opening in plate 106. The forward projection of pin 109 is loosley captured in a vertical slot 110 (FIG. 3) of a vertically upwardly extending front end portion 111 of the plate 106 of the bracket 25. A latch 112 (FIG. 1) in the form of a vertical plate pivotally mounted at one end and in parallel to the portion 111 includes another narrower slot 114 also capturing the pin 109. The slot 114 is only slightly wider than the diameter of pin 109, so that when the latch 112 is in the position shown by solid lines in FIGS. 1 and 3, the post 24 is prevented from pivoting about its vertical Y axis. However, when the latch 112 is rotated into the dot-and-dashed line position shown in FIG. 1, the post 24 is released for rotation about the axis Y, thereby permitting the entire drum assembly 16 to be articulated laterally about the handle assembly 28. The limit of articulation is controlled by the width of the wider slot 110 of portion 111 through which the pin 109 continues to project even when the drum assembly is unlatched.

In operation, a vehicle whose characteristics are to be evaluated is placed with its front wheels (FIG. 6A) or its back wheels (FIG. 6B), as desired, in the confines of the basket 14 with the other wheels in contact with the terrain simulating surface 11. For a two-wheel drive vehicle, for example, with its front wheels restrained in the basket 14 (FIG. 6A) the rear wheels can then be driven to move the endless track surface 11 tangentially along a continuous loop path for a determination of relative speed between the stationary vehicle 15 and the surface 11. In this manner, changes in the configuration of the vehicle 15 can be directly measured in terms of speed performance increases or decreases. For example, R/C racers of the type to which the test stand of the invention has application frequently have knobbed tires. Racing performance can be effected by trimming the knobs to find an optimum balance between knob width and tire diameter. Changes can be made to the tires and the resulting performance differences immediately measured to strike an optimum configuration.

For four-wheel drive vehicles, speed performance can be evaluated with either the front or rear wheels in driving contact with the surface 11. With four-wheel drive vehicles, however, the wheels within the basket 14 must be isolated, i.e. such as by using additional pins 61a (discussed above in reference to FIG. 2) extending between the front 51 and the upwardly directed ramps 54, 55) to raise the wheels up from the floor 50 of the basket 14. Pins 61, 61a are freely positionable between apertures of the perforated surfaces of the basket 14 as desired to meet the needs of a particular test. Means may be provided to permit the basket 14 to be repositioned on handle assembly 28 or its orientation or configuration may be changed to suit individual tastes. The basket 14 is advantageously dimensioned to accommodate standard, similarly sized vehicles 15 with sufficient room to provide some movement about the basket 14. The front wall 51 of the basket 14 is forward raked because of the slant handle 28. With a handle slant of 30 degrees, a two-wheel drive vehicle 15 positioned with its undriven wheels in the basket 14 will roost to the top inside corner of the basket 14 while under hard acceleration.

For evaluation of vehicle tracking, the latch 112 can be pivoted to release the pin 109 to permit the drum 16 to pivot freely relative to the vertical axis Y presented by post 24, as represented schematically in FIG. 6B. In such case, for example, the crank handle 76 can be turned to rotate the drum 16 manually, thereby moving the surface 11 past the wheels of the vehicle 15 positioned within the basket 14 not under power. The steering servos of the vehicle 15 can then be operated as the drum 16 is rotated so that tracking effectiveness of vehicle 15 relative to the terrain represented by the surface 11 can be ascertained, observing the pivotal movement of the drum in response to steering maneuvers. Similar tests can be conducted with surface 11 driven by the vehicle 15, without using the crank 76.

It will be appreciated that other powered and unpowered vehicle performance tests can also be conducted using the apparatus 10 described. One particularly useful test is a test to appreciate the useable charge life of an on-board battery power pack under realistic track-like driving conditions. A vehicle 15 with a fully charged battery pack can be run through a sequence of acceleration, deceleration, braking and directional control activities to simulate actual runs and see how the pack life is affected.

The surface 11 can be made up by a thin underlayment layer 73, e.g. a sheet of aluminum, covered with a plain or contoured track simulating layer 74 (see FIGS. 7A and 7B). It has been observed that an off-track dirt raceway surface of the type encountered in ROAR sanctioned races can be approximated by a drum 16 having an outer surface 11 of deep pile polyethylene Astroturf TM material as shown in FIGS. 1 and 3, and that a concrete track can be approximated by a low pile rug surface as shown in FIG. 7B. A set of tires engage in and on the surface 11 the same as it would work the surface of an actual track. The polyethylene sprigs of Astroturf TM material, for example, afford a true track-like bite, yet impart minimum tire wear at the spike edges. Other track surfaces are simulated in similar fashion. The invention thus gives a means to simulate various terrains to give the desired performance evaluation criteria for a particular running surface.

In one aspect of the invention, a plurality of drums 16 can be provided to give a user the option of selecting a desired surface. FIGS. 7A and 7B illustrate drums 16', 16" with different surfaces 74 for use on the test stand 10. FIG. 7A in contrast to FIG. 7B, provides a non-uniform track simulating surface 11 in the form of a rough terrain having crests and crevices unevenly spaced across the width of the drum surface 11. Such a contour may assist in suspension evaluation. Where different surfaces are provided on different diameter interchangeable drums, it is convenient to mark the drums with a calibration speed indication for stroboscopic calibration of the tangential velocity indicating means following changeout. As an alternative to having interchangeable complete drums, selection of terrain simulations may be offered by having a plurality of interchangeble surfaces 74 and providing a single drum 16 with means for interchangeably removably mounting any selected one of the same at a given time.

It is considered advantageous to dimension and configure the test stand 10 so that the inertial forces encountered by an R/C vehicle 15 reacting against an actual track will be substantially duplicated through the configuration and mass of the track drum 16, when the vehicle 15 is held stationary and the driving force imposed by the vehicle wheels onto the drum surface 11. This is accomplished by making the magnitude of the polar moment of inertia of the drum equal to the magnitude of the mass of the standard vehicle 15 to be tested, i.e. when both quantities are measure,d in a given system of units the ratio of the drum's moment of inertia to the mass of vehicle 15 would be equal to one times the square of the base unit of length in the given system.

The formula for the mass of the vehicle 15 is given by:

$$M = W/g \tag{1}$$

where, M is the mass, W is the weight of the vehicle, and g is the acceleration due to the gravitational constant, or 32.16 ft/sec$^2$.

The formula for the moment of inertia of the drum 16 is given by:

$$Jm = W(k_o^2)/g \tag{2}$$

where, W is the total weight of the track drum, $k_o$ is the radius of gyration (the distance from the axis of the drum shaft 79 to the point at which the entire mass is considered concentrated), and g is the same as in equation (1), above.

Using formulas (1) and (2), above, a drum having a total weight of 7.5 lbs., a radius of 0.79 ft. and a radius of gyration of 0.6 ft. was found equivalent in inertial reaction to a vehicle 15 having a weight of about 3.25 pounds (the fully trimmed legal minimum ROAR approved weight for two-wheel drive off-track R/C racers). With weight of 3.25 to 3.5 lbs. in equation (1), the mass of vehicle 15 is found to be: 3.50 lbs/32.16 ft/sec$^2$=0.1 lb sec$^2$/ft or 0.1 slug. And, adding one inch (=0.08 ft) to $k_o$ to take into account the frictional constant of the bearings 85, the polar moment of inertia of the track simulating drum 16 is: (7.5 lbs×0.68 ft$^2$)/32.16 ft/sec$^2$=0.1 ft lb sec$^2$ or 0.1 slug ft$^2$. Thus, the equivalence is shown.

It can, thus, be appreciated by consideration of the illustrative embodiment shown and described, that the invention provides a portable test stand for R/C racers and the like in which an endless loop of terrain simulating track can be driven to evaluate various vehicle parameters in a dynamic way. The wheeled caddy embodiment is convenient in its transportability and is simplistic in design. It will be appreciated, however, that other configurations of framework can serve the same purpose and that other means of supporting and driving the endless surface 11 can be used. Moreover, while the basket 14 is convenient for restraining the vehicle 15 during testing, other structures may be found that serve the equivalent purpose.

Accordingly, it is intended to cover all such other various substitutions and modifications which may be made to the test stand example described above, that do not depart from the spirit and scope of the present invention as defined by the claims appended hereto.

We claim:

1. A portable test stand and track simulator for a radio-controlled model racer or similar vehicle having a wheelbase having a length and a width and including front and rear sets of wheels, comprising:
   a support frame;
   a terrain simulating surface, having a length which is greater than said wheelbase length and a width which is greater than said wheelbase width and which takes the form of an endless loop;
   means mounting said surface on said frame for free tangential movement of said surface about an axis of rotation located within said loop;
   means located on said frame for restraining said vehicle in stationary position relative to said frame, with one of said sets of wheels located for frictional engagement with said surface to drive said surface about said loop axis; and means for determining the tangential velocity adjacent said one set of wheels of said driven surface to give an indication of the speed said vehicle would attain unrestrained under corresponding conditions on an actual track.

2. A test stand as claimed in claim 1, wherein said mounting means further comprises means mounting said surface for free pivotal movement of said surface about a pivotal axis transverse to said loop axis in response to directional control imparted to said one set of wheels, to give an indication of the tracking said vehicle would exhibit during directional maneuvers under corresponding conditions on an actual track.

3. A test stand as in claim 2, further comprising auxiliary means for driving said surface about said loop independent of any driving force imparted by said one set of wheels.

4. A test stand as in claim 2, wherein said pivotal movement mounting means comprises means mounting said surface for movement about a pivotal axis located outside of said loop and oriented perpendicularly to said loop axis.

5. A test stand as in claim 1, wherein said terrain simulating surface comprises a cylindrical surface of polyethylene pile material.

6. A test stand as in claim 1, wherein said velocity determining means comprises a generator, and means for driving said generator responsive to tangential movement of said surface to generate an electrical signal indicative of said velocity.

7. A test stand as in claim 1, wherein said velocity determining means comprises a magnetic sensor mounted on said frame, a magnet mounted for movement with said surface, and an electronic speed indicator responsive to detection by said sensor of movement with said surface of said magnet to generate an electrical signal indicative of said velocity.

8. A test stand as in claim 1, wherein said surface and means mounting said surface on said frame are dimensioned, in a given system of dimensional units having a base length unit, and configured so that the ratio of the moment of inertia of the surface driven by said restrained vehicle in said given system of dimensional units to the mass vehicle would present unrestrained in working against an actual track in said given system of dimensional units is substantially equal to one times the square of the base length unit in said given system of dimensional units.

9. A portable test stand and track simulator for a radio-controlled model racer or similar vehicle having a wheelbase having a length and a width and including front and rear sets of wheels, comprising:
 a support frame having a base and an upright portion;
 a drum having a terrain simulating outer cylindrical surface having a circumference which is larger than said wheelbase length and a width which is larger than said wheelbase width;
 means mounting said drum on said frame for free rotation of said surface about a horizontal central axis;
 a basket located on said upright portion for restraining said vehicle in a stationary position relative to said frame, said set of wheels received within said basket and the other set of wheels located for frictional engagement with said surface to drive said surface about said axis; and
 means for determining the tangential velocity adjacent said other set of wheels of said driven surface to give an indication of the speed said vehicle would attain unrestrained under corresponding conditions on an actual track.

10. A test stand as in claim 9, wherein said mounting means further comprises means mounting said drum for free pivotal movement of said drum about a vertical axis in response to directional control imparted to said other set of wheels, to give an indication of the tracking said vehicle would exhibit during directional maneuvers under corresponding conditions on an actual track.

11. A test stand as in claim 10, wherein said mounting means comprises a tubular drum support assembly including a vertical post and arms attached to said post and extending to distal ends adjacent respective sides of said drum, means mounting said vertical post to said upright portion for pivotal movement about a post vertical axis, and means journalling said drum for rotation at said arm distal ends.

12. A test stand as in claim 11, wherein said journalling means comprises journal rings attached to said arm distal ends and bearing inserts located within said journal rings, and said drum further comprises oppositely disposed support wheels having central hubs formed with outwardly protruding boss ends coaxially located on said hubs and respectively received within said bearing inserts.

13. A test stand as in claim 9, further comprising auxiliary means for driving said surface about said central axis independent of any driving force imparted by said other set of wheels.

14. A test stand as in claim 13, wherein said auxiliary driving means comprises a crank handle attached to said drum for turning about said central axis, and a counterweight oppositely positioned on said drum to said handle to counteract an unbalancing effect of the weight of said crank handle on said drum rotation.

15. A test stand as in claim 9, further comprising marker means positioned on said drum for stroboscopic verification of rotation of said drum at a predetermined tangential velocity of said surface, and means for calibrating said velocity determining means in accordance with said stroboscopic verification of said predetermined velocity.

16. A test stand as in claim 15, wherein said velocity determining means comprises a generator having a drive shaft and two output terminals, means coupling said drive shaft to said drum for rotation therewith, a resistor electrically coupled between said output terminals, and means for varying the resistance of said resistor to effect calibration.

17. A test stand as in claim 9, wherein said basket comprises an open-ended box-like structure having a floor, a front side wall and a top all formed with a plurality of perforations, the back of the floor extending into a downwardly angled lip which is bounded on either side by upwardly extending ramps, and said perforations being positioned to receive vehicle retaining pins therethrough.

18. A test stand as in claim 9, wherein said drum and means mounting said drum on said frame are dimensioned and configured so that the magnitude of the moment of inertia of said drum is substantially the same as the magnitude of the mass of said vehicle, when both are expressed in the foot-pound-sec system, i.e. the ratio of the moment of inertia of said drum to the mass of said vehicle is substantially equal to one foot squared.

19. A portable test stand and track simulator for a radio-controlled model racer or similar vehicle having a wheelbase having a length and a width and including front and rear sets of wheels, comprising:
- a wheelbase support frame having a rectangularly-configured base including a laterally extending ground rail at its back and wheels located at its front, an upright handle portion extending upwardly from the front of said base to a forwardly and outwardly slanted handle;
- a drum having oppositely disposed support wheels with central hubs and outwardly protruding boss ends coaxially located on said hubs; and a terrain simulating outer cylindrical surface having a circumference which is larger than said wheelbase length and a width which is larger than said wheelbase width, said surface extending between said support wheels;
- a tubular drum support assembly including a vertical post and arms attached to said post and extending to distal ends adjacent respective sides of said drum, means mounting said vertical post to said handle portion for pivotal movement about a post vertical axis, journal rings attached to said arm distal ends, and bearing inserts in the form of bushings located within said journal rings and rotationally receiving said boss ends;
- an open-ended box-like basket located on said handle and having a floor, a front side wall and a top for restraining said vehicle in stationary position relative to said frame, with one set of wheels received within said basket and the other set of wheels located for frictional engagement with said surface to drive said surface about a central hub axis; and
- a generator having a drive shaft and two output terminals, and means coupling said drive shaft to one of said hubs for rotation therewith to generate an electrical signal at said output terminals corresponding to the tangential speed of said drum surface, to give an indication of the speed said vehicle would attain unrestrained under corresponding conditions on an actual track.

20. A test stand as in claim 19, wherein said means mounting said vertical post to said handle portion comprises aligned upper and lower horizontal plates having openings therein through which said post depends, a stop pin extending transversely through said post above said plates, said upper plate having an upwardly extending portion with a vertical slot which loosely captures said stop pin to limit the extent of vertical pivoting of said post within said openings, and a latch having a latch slot therein and being pivotally mounted to said upwardly extending portion to rotate from a latched position in which said stop pin is confined in post rotation immobilizing position within said stop pin is free to move within the confines of said vertical slot.

* * * * *